United States Patent
Nishijima et al.

(10) Patent No.: US 8,568,004 B2
(45) Date of Patent: Oct. 29, 2013

(54) DIRECTION INDICATOR AND SADDLE RIDING TYPE VEHICLE INCLUDING SAME

(75) Inventors: Hiroshi Nishijima, Wako (JP); Hiroyasu Ota, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 245 days.

(21) Appl. No.: 13/232,033

(22) Filed: Sep. 14, 2011

(65) Prior Publication Data

US 2012/0069590 A1  Mar. 22, 2012

(30) Foreign Application Priority Data

Sep. 17, 2010 (JP) .................. 2010-209629

(51) Int. Cl.
  *B62J 6/00* (2006.01)
  *B60Q 1/34* (2006.01)
(52) U.S. Cl.
  USPC .......................... 362/473; 362/540
(58) Field of Classification Search
  USPC .................................. 362/473, 540
  See application file for complete search history.

(56) References Cited

U.S. PATENT DOCUMENTS

| | | | |
|---|---|---|---|
| 8,256,939 B2 * | 9/2012 | Onoda et al. | 362/473 |
| 8,342,724 B2 * | 1/2013 | Hotei et al. | 362/473 |
| 2008/0158896 A1 * | 7/2008 | Mochizuki | 362/473 |
| 2009/0185388 A1 * | 7/2009 | Kageyama | 362/473 |
| 2009/0196056 A1 * | 8/2009 | Kageyama | 362/473 |
| 2010/0244493 A1 * | 9/2010 | Iida et al. | 296/193.08 |

FOREIGN PATENT DOCUMENTS

| | | |
|---|---|---|
| JP | S51-77072 | 6/1976 |
| JP | S58-39338 | 3/1983 |
| JP | 58-164883 | 11/1983 |
| JP | 05-097081 | 4/1993 |
| JP | 2010-083358 | 4/2010 |
| JP | 2011-016439 | 1/2011 |

* cited by examiner

*Primary Examiner* — Stephen F Husar
*Assistant Examiner* — James Cranson, Jr.
(74) *Attorney, Agent, or Firm* — Rankin, Hill & Clark LLP

(57) ABSTRACT

A direction indicator includes a direction indicator main unit, a grommet for elastically supporting the direction indicator main unit to a front cowl on a vehicle body side, a retainer for removably fixing the front cowl on the vehicle body side and the direction indicator main unit via the grommet, and a shouldered bolt for fastening the retainer and the direction indicator main unit. A fastening portion of the direction indicator main unit to which the retainer is fastened with the shouldered bolt has a groove that serves as a weakened or fragile portion that is deformed or damaged when the direction indicator engages the ground.

20 Claims, 15 Drawing Sheets

DIRECTION INDICATOR AND SADDLE RIDING TYPE VEHICLE INCLUDING SAME

BACKGROUND OF THE INVENTION

1. Field of the Invention

The present invention relates to a direction indicator and a saddle riding type vehicle including a direction indicator.

2. Description of Related Art

Some saddle riding type vehicles, such as motorcycles, have direction indicators on sides of their vehicle bodies. The direction indicators may be mounted on a rear fender at a rear portion of the vehicle body using bolts and nuts, such as taught by Japanese Patent Laid-open No. Sho 58-164883, and/or on a front fender at a front portion of the vehicle body, such as taught by Japanese Patent Laid-open No. Hei 05-97081 and Japanese Patent Laid-open No. 2010-83358.

However, if a direction indicator collides with a road surface as the vehicle tips over, various forms of collision are possible. For example, if the direction indicator is fixed to a front cowl of the vehicle body, the area around a portion to which the front cowl is fixed may be damaged. In this case, not only the direction indicator, but also the front cowl needs repair. Therefore, there exists a need in the art for a direction indicator structure that may limit damage to the vehicle body in the event of a collision with a road surface.

SUMMARY OF THE INVENTION

The present invention is directed toward providing a direction indicator and a saddle riding type vehicle including a direction indicator, wherein the direction indicator is capable of absorbing impact even when the impact acts thereon from a road surface such as, for example, when the vehicle tips over, without allowing stress to concentrate of a portion on a vehicle body at which the direction indicator is fixed.

In accordance with the present invention, the direction indicator includes a direction indicator main unit; an elastic member for elastically supporting the direction indicator main unit to a fixing portion on a vehicle body side; a fixing member for removably fixing the fixing portion on the vehicle body side and the direction indicator main unit via the elastic member; and a fastening member for fastening the fixing member and the direction indicator main unit. The direction indicator main unit to which the fixing member is fastened with the fastening member has a fragile portion disposed near the fastening portion.

Therefore, when, for example, stress acts on the direction indicator during upset of the vehicle, the direction indicator main unit, not the fixing portion on the vehicle body side, bears the stress to thereby be deformed or damaged with the fragile portion as a starting point. This minimizes deformation or damage on the vehicle body side. If the vehicle body side does not need to be repaired, repair costs can be reduced.

In further accordance with the present invention, the fixing portion on the vehicle body side includes a front cowl. Due to the structural arrangement of the present invention, the front cowl can be prevented from being deformed or damaged during upset of the vehicle.

In further accordance with the present invention, the fixing portion on the vehicle body side includes a rear cowl. Due to the structural arrangement of the present invention, the rear front cowl can be prevented from being deformed or damaged during upset of the vehicle.

In further accordance with the present invention, the fixing portion on the vehicle body side includes a rear fender. Due to the structural arrangement of the present invention, the rear fender can be prevented from being deformed or damaged during upset of the vehicle.

In further accordance with the present invention, the fixing member is formed of a metal having stiffness greater than that of the direction indicator main unit, which is formed of a resin. Due to this arrangement, during upset of the vehicle stress can be applied by the fixing member to the direction indicator main unit to thereby deform or damage the direction indicator main unit, thus inhibiting damaging effects on other members.

In accordance with another aspect of the invention, the fragile portion of the direction indicator main unit is disposed at a position at which the fixing member and the direction indicator main unit interfere with each other, the position being in a direction in which the direction indicator main unit abuts on a road surface to thereby be bent by the elastic member. According to this aspect, the fixing member having a high stiffness directly applies stress to the fragile portion, which inhibits the stress from acting on other portions.

In accordance with a further feature of the invention, the fixing member includes a mounting tab extending from an inside of the fixing portion on the vehicle body side to the direction indicator main unit on an outside; the mounting tab has a mounting end disposed at a proximal portion thereof, the mounting end being bent and extending toward a diametric outside of a mounting seat of the elastic member; and the mounting tab has a distal end fastened to the direction indicator main unit with the fastening member. Accordingly, the direction indicator main unit and the fixing member are fastened together with the mounting tab, and the mounting tab abuts on the fragile portion of the direction indicator main unit to thereby promote deformation or damage of the direction indicator main unit. Further, the direction indicator main unit can be prevented from coming off from the fixing portion on the vehicle body side.

In further accordance with the present invention, the fragile portion is disposed on an upper side in a vehicle body vertical direction of the direction indicator main unit. Thus, the fragile portion is disposed at an upper side portion of the direction indicator main unit on which the stress of the direction indicator main unit tends to act. This allows the direction indicator main unit to bear the stress effectively and inhibits other portions from being affected.

In accordance with another feature of the invention, the elastic member has a positioning portion for positioning the fixing member. As such, the fixing member and the direction indicator main unit are fixed together with the fixing member positioned via the elastic member. Stress can be inhibited from acting on the vehicle body side in cooperation with the elastic member, without the direction indicator main unit being directly fixed onto the vehicle body side.

According to another aspect of the present invention, the fixing portion on the vehicle body side includes a taillight unit and the taillight unit includes a taillight and a taillight cover. The direction indicator main unit, mounted by fitting the elastic member in the taillight cover, is fastened with the fastening member to the fixing member inserted into the elastic member from an inside of the taillight cover. Therefore, when, for example, stress acts on the rear direction indicator during upset of the vehicle, such as a saddle riding type vehicle, the direction indicator main unit, not the taillight unit (taillight cover), bears the stress to thereby be deformed or damaged with the fragile portion as a starting point. This prevents the taillight unit (taillight cover) from being deformed or damaged.

DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
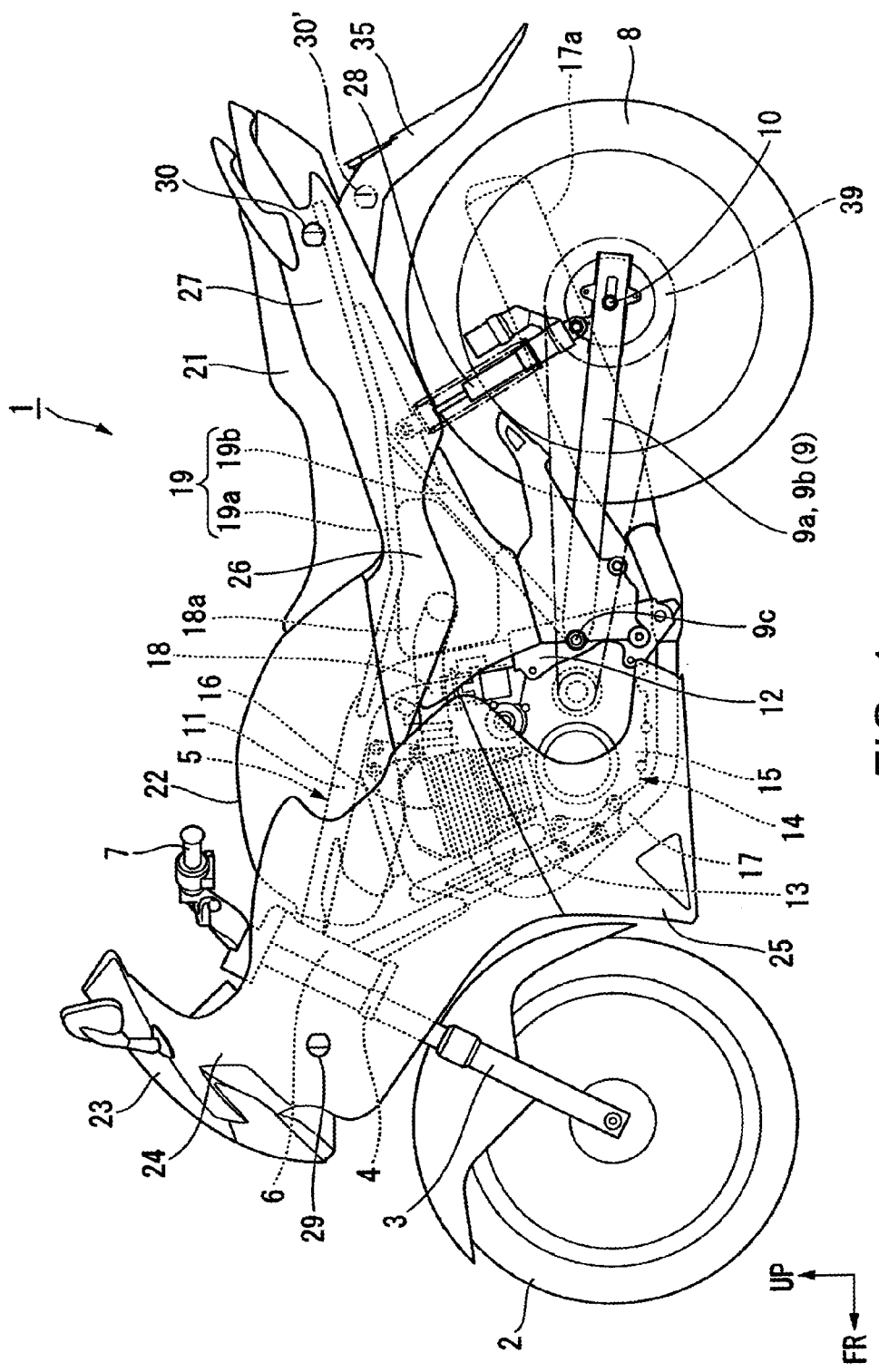
FIG. 1 is a side elevational view showing a motorcycle according to an embodiment of the present invention.
Figure 2:
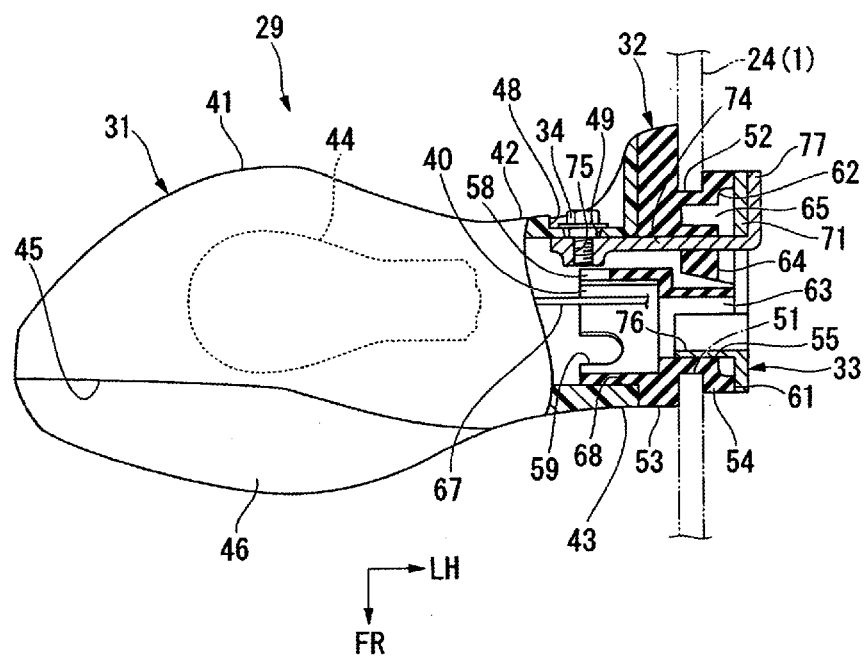
FIG. 2 is a partial cross-sectional view showing a front direction indicator as viewed from an upward direction.
Figure 3:
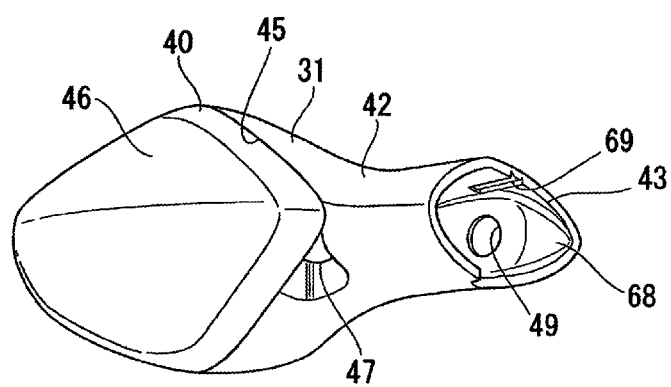
FIG. 3 is a perspective view showing a direction indicator main unit.
Figure 4:
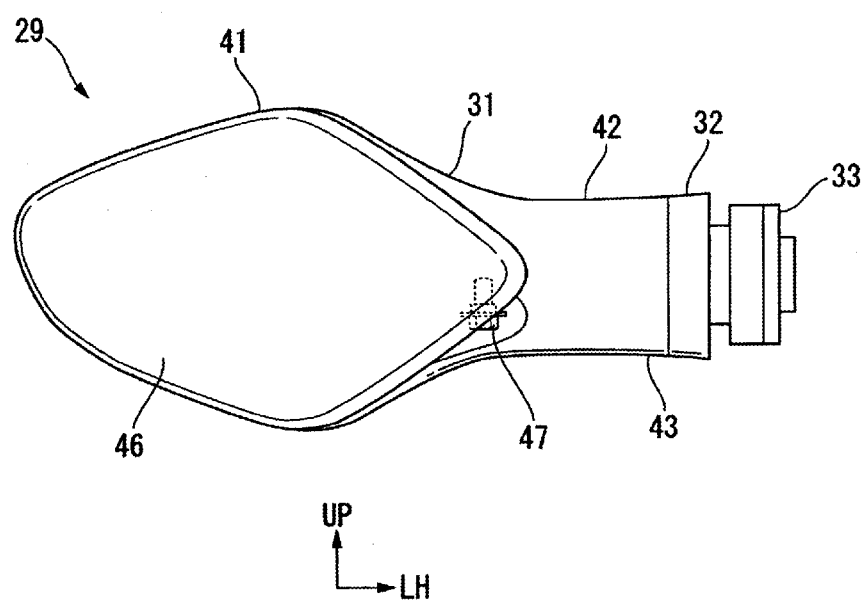
FIG. 4 is a front elevational view showing the front direction indicator.
Figure 5:
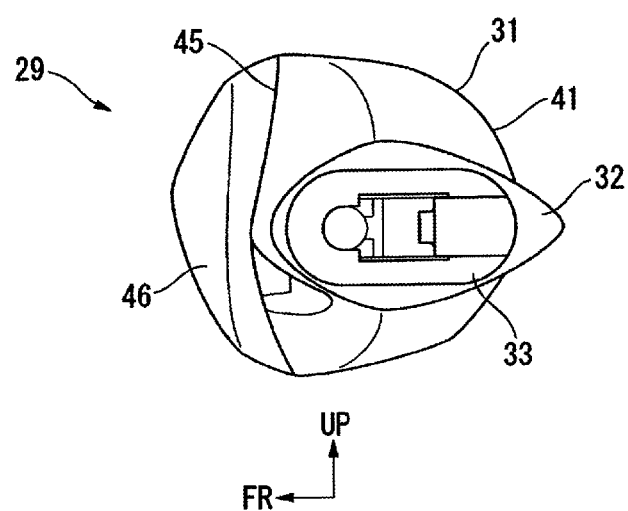
FIG. 5 is a side elevational view showing the front direction indicator as viewed from a side of a retainer of the front direction indicator.

A specific embodiment to which the present invention is applied will be described below with reference to the accompanying drawings. In the drawings, an arrow FR denotes a vehicle forward direction, an arrow LH denotes a vehicle leftward direction, and an arrow UP denotes a vehicle upward direction, respectively.

Referring to FIG. 1, a front wheel 2 of a motorcycle 1 is journaled on a lower end portion of a pair of front forks 3. An upper portion of each of the front forks 3 is steerably pivoted at a head pipe 6 at a front end of a vehicle body frame 5 via a steering stem 4. A handlebar 7 for steering the front wheel 2 is mounted at an upper portion of the steering stem 4. A rear wheel 8 of the motorcycle 1 is journaled on a rear axle 10 at a rear end portion of a swing arm 9 that is pivotable about a pivot shaft 9c.

The vehicle body frame 5 mainly includes a main frame 11 that extends rearwardly from an upper portion of the head pipe 6 and then bends downwardly. A pivot bracket 12 that supports a front end portion of the swing arm 9 on the pivot shaft 9c is integrally disposed on a lower side at a rear portion of the main frame 11. A down frame 13 extends obliquely downwardly toward the rear from a lower portion of the head pipe 6. An engine 14 is mounted on an inside of the vehicle body frame 5. A crankcase 15 of the engine 14 has a front end portion supported on a lower portion of the down frame 13. The crankcase 15 has a rear end portion supported on a front portion of the pivot bracket 12.

The engine 14 includes a cylinder 16 on top of the crankcase 15. The cylinder 16 is inclined slightly forwardly. An exhaust pipe 17 is connected to a front portion of the cylinder 16. The exhaust pipe 17 bends and extends rearwardly so as to extend forwardly and downwardly of the crankcase 15 before connecting to a silencer 17a disposed on the right side of a rear portion of the vehicle body. A fuel supply system 18 such as, for example, a carburetor or a throttle body is connected to a rear portion of the cylinder 16. An air cleaner box 18a is connected rearwardly of the fuel supply system 18.

A saddle riding seat 21 on which a rider sits is supported on an upper portion of a seat frame 19 that constitutes a rear portion of the vehicle body frame 5. A fuel tank 22 supported on the main frame 11 is disposed forwardly of the seat 21.

A windshield 23 stands upright on an upper side at the front portion of the vehicle body. A front cowl 24, an under cowl 25, a side cowl 26, and a rear cowl 27 are disposed at a front portion, a lower portion, a side portion, and a rear portion of the vehicle body to cover the front portion, the lower portion, the side portion, and the rear portion of the vehicle body.

Front direction indicators 29, 29 are disposed on either side of the front cowl 24 and rear direction indicators 30, 30 are disposed on either side of the rear cowl 27. A rear fender 35 extending rearwardly is disposed upwardly of the rear wheel 8.

The seat frame 19 mainly includes a pair of left and right seat rails 19a and a pair of left and right support pipes 19b. The seat rails 19a extend rearwardly, substantially horizontally, from rear sides of the rear portion of the main frame 11. The support pipes 19b extend obliquely upwardly toward the rear across the pivot bracket 12 and longitudinal middle portions of the seat rails 19a. Each of left and right rear cushions 28 is disposed at a forwardly inclined attitude between a rear end portion of each of the support pipes 19b and a rear portion of each of left and right arm members 9a, 9b of the swing arm 9.

The front direction indicator 29 and the rear direction indicator 30 will be described below. The front direction indicator 29 and the rear direction indicator 30 are structured similarly, except that the front direction indicator 29 has a forward illuminating direction, while the rear direction indicator 30 has a rearward illuminating direction. The front direction indicator 29 will therefore be described. In addition, though the front direction indicators 29 are disposed at right and left sides, only the front direction indicator 29 at the right side will be described as an example for sake of illustration.

Referring to FIGS. 2 to 5, the front direction indicator 29 includes a direction indicator main unit 31, a grommet 32, a retainer 33, and a shouldered bolt 34. Specifically, the direction indicator main unit 31 is formed of a resin. The grommet 32, formed of rubber, elastically supports the direction indicator main unit 31 on the front cowl 24. The retainer 33, formed of a metal having stiffness greater than the direction indicator main unit 31, removably fixes the front cowl 24 and the direction indicator main unit 31 via the grommet 32. The shouldered bolt 34 fastens the retainer 33 and the direction indicator main unit 31.

More specifically, the grommet 32 is fitted into an opening 51 formed as a mounting portion in the front cowl 24. The direction indicator main unit 31 is supported by a portion of the grommet 32 outside the vehicle body relative to the front cowl 24. The retainer 33 is disposed at a portion of the grommet 32 inside the vehicle body relative to the front cowl 24 and prevents the grommet 32 from coming off onto the outside. The retainer 33 also has a mounting tab 74 that is passed through the grommet 32 and extends into the direction indicator main unit 31 on the outside of the vehicle body relative to the front cowl 24. The shouldered bolt 34 fastens the mounting tab 74 of the retainer 33 and the direction indicator main unit 31.

The direction indicator main unit 31 is a resin member including a head portion 41 and a proximal portion 43. Specifically, the head portion 41 is formed into a laterally long sphere. The proximal portion 43 is formed to have an enlarged diameter relative to, and via, a constricted portion 42 that is continuous with the head portion 41. The direction indicator main unit 31 includes a bulb 44 disposed in the head portion 41 and has an opening 45 formed in a front surface of the head portion 41. The bulb 44 is fitted to a socket (not shown) disposed inside the direction indicator main unit 31. A clear lens 46 is removably attached to the opening 45 with a screw 47, which allows the bulb 44 to be replaced with a new one by removing the clear lens 46.

The proximal portion 43 of the direction indicator main unit 31 is open. The proximal portion 43 has an escape recess 48 for the shouldered bolt 34 formed in a rear surface of the constricted portion 42. The escape recess 48 has an insertion hole 49 formed therein for the shouldered bolt 34.

Figure 6:
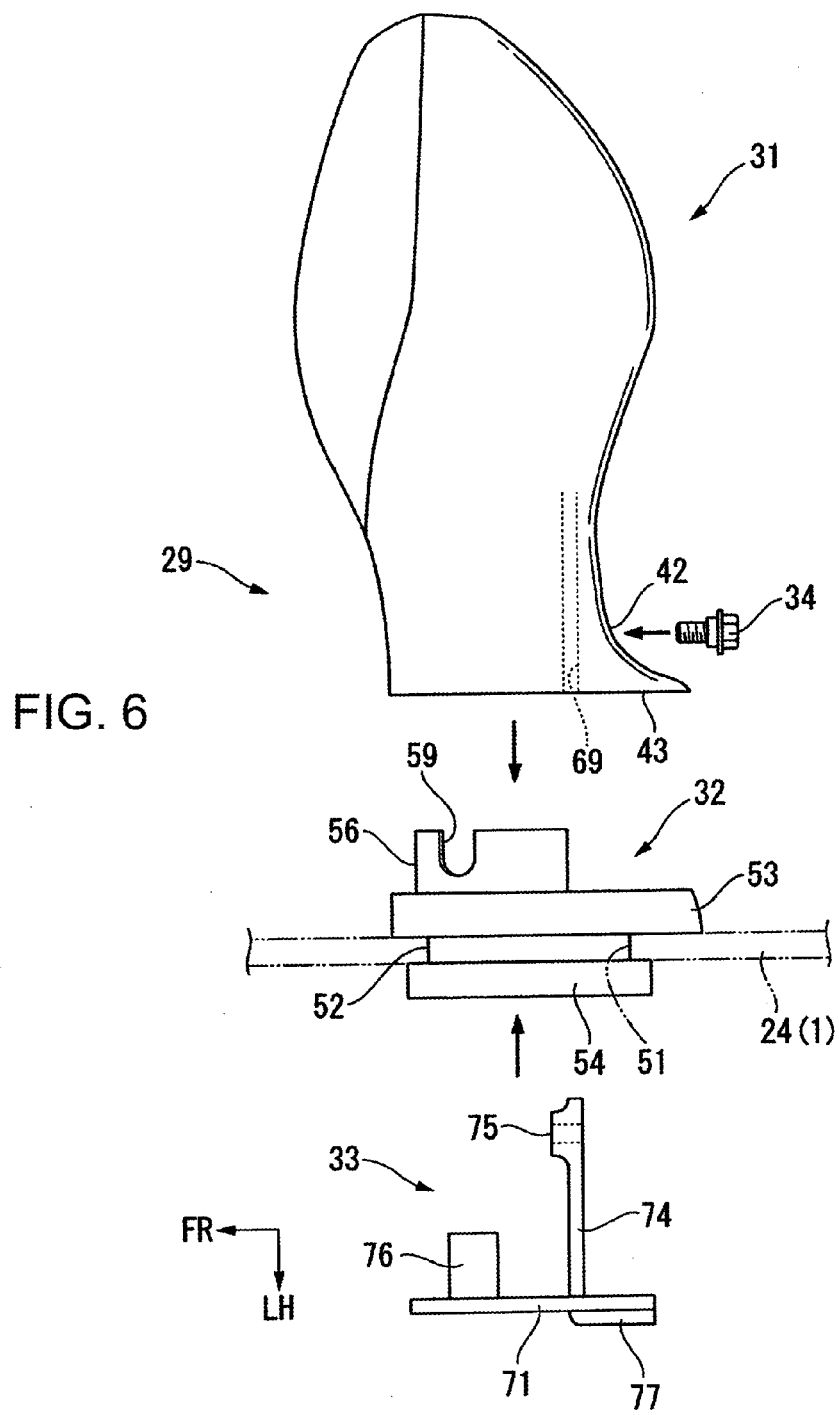
FIG. 6 is an exploded plan view showing a condition in which the front direction indicator is attached.

Referring to FIG. 6, the grommet 32 has a fitting portion 52 throughout an entire periphery. The fitting portion 52 serves as a groove to be fitted in the opening 51 formed in the front cowl 24. The grommet 32 includes a substantially rhomboid support portion 53 formed on the outside of the fitting portion 52 relative to the front cowl 24. The support portion 53 has an enlarged diameter relative to the fitting portion 52 and abuts on an outside surface of the front cowl 24. In addition, the grommet 32 includes an oblong mounting seat 54 for the retainer 33, formed on the inside of the fitting portion 52 relative to the front cowl 24. The mounting seat 54 has a slightly enlarged diameter relative to the fitting portion 52 and abuts on an inside surface of the front cowl 24. The grommet 32 is fitted into position as follows: specifically, the mounting seat 54 is pushed from the outside into the opening 51 in the front cowl 24; as the mounting seat 54 is restored to its original shape, the fitting portion 52 is fitted into the opening 51 in the front cowl 24.

Figure 7:
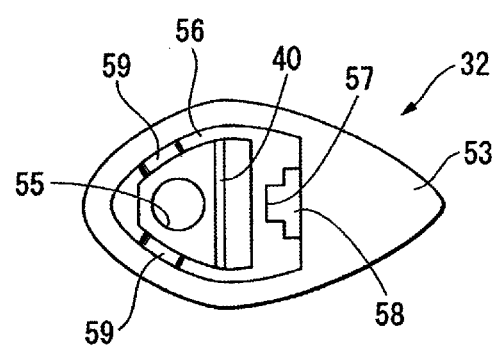
FIG. 7 is a plan view showing a grommet.

Referring to FIG. 7, the support portion 53 of the grommet 32 has a round hole 55 formed at a first end portion thereof to penetrate therethrough. An inserting portion 56 is erected so as to surround the round hole 55 (see also FIG. 6). The inserting portion 56 is inserted, while being slightly reduced in diameter, into an inner wall 68 of the proximal portion 43 of the direction indicator main unit 31. In a plan view, the inserting portion 56 is formed into a substantially triangular shape along an inside on a first end side of the rhombus of the support portion 53 and surrounds the round hole 55 at a location near an apex of the triangle. A wall portion 57 on the side of a base of the triangle has a positioning hole 58 formed therein along an outside surface. An end portion of the mounting tab 74 of the retainer 33, to be described later, is exposed through the positioning hole 58. The inserting portion 56 further has a pair of arcuate cutouts 59 formed near the round hole 55. The cutout 59 gives elasticity to the inserting portion 56. When the inserting portion 56 is inserted into the proximal portion 43 of the direction indicator main unit 31, an outer edge of the support portion 53 becomes continuous with an outer peripheral edge of the proximal portion 43 of the direction indicator main unit (see FIGS. 2 and 4). The grommet 32 further has an insertion portion 40 formed near the round hole 55 at a position across the round hole 55 from the apex of the triangle. The insertion portion 40 communicates with a penetration portion 63, to be described later.

Figure 8:
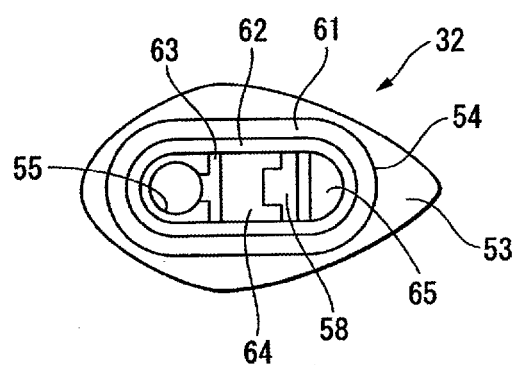
FIG. 8 is a rear elevational view showing the grommet.

Referring to FIGS. 6 and 8, the mounting seat 54 of the grommet 32 has a concaved portion 62 that is concaved inwardly from an outer peripheral edge 61, so that the outer peripheral edge 61 rises upwardly throughout the entire periphery. This allows the mounting seat 54 to be easily reduced in diameter as compared with an arrangement having no concaved portion 62 formed, so that the mounting seat 54 can be easily inserted into the opening 51 in the front cowl 24. The round hole 55 penetrates through the support portion 53 at a location inside the concaved portion 62 on a first end side of the mounting seat 54. The mounting seat 54 further includes the penetration portion 63 disposed on a second end side of the mounting seat 54 adjacent the round hole 55, and a flat portion 64 disposed at a location even closer to the second end side of the mounting seat 54 than the penetration portion 63. The flat portion 64 traverses the concaved portion 62 in a width direction of the mounting seat 54. The mounting seat 54 further has a recess 65 formed on the second end side thereof. The flat portion 64 has the positioning hole 58 formed therein on the second end side of the mounting seat 54, into which the mounting tab 74 of the retainer 33 is to be inserted. A wiring harness 67 is passed through the penetration portion 63.

Figure 9:
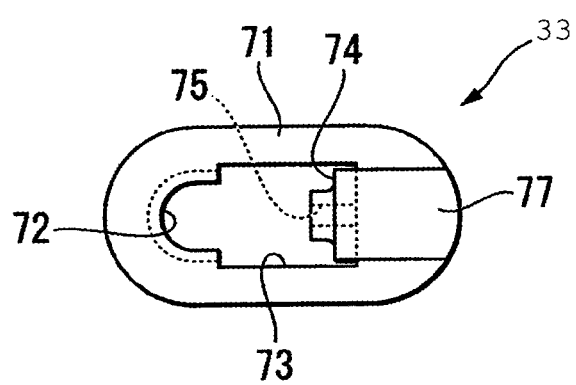
FIG. 9 is a plan view showing the retainer.
Figure 10:
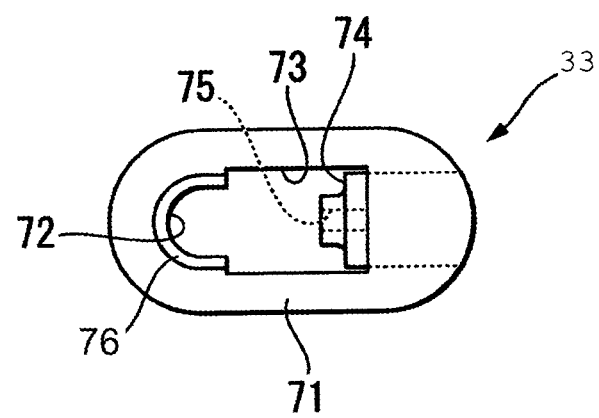
FIG. 10 is a rear elevational view showing the retainer.

Referring to FIGS. 6, 9, and 10, the retainer 33 prevents the grommet 32 from coming off the opening 51 in the front cowl 24 in a condition in which the retainer 33 abuts on the mounting seat 54 of the grommet 32 and the grommet 32 is fitted in the opening 51 in the front cowl 24. Specifically, the retainer 33 includes a flat base portion 71 that abuts on the mounting seat 54 of the grommet 32. The base portion 71 has an outer peripheral edge formed to be larger than the opening 51 in the front cowl 24 into which the fitting portion 52 of the grommet 32 fits, so that the base portion 71 can be prevented from being removed from the opening 51 in the front cowl 24. The base portion 71 is formed into an oblong shape so as to be aligned with the outer peripheral edge 61 of the mounting seat 54 of the grommet 32, abutting on the outer peripheral edge 61 of the mounting seat 54 of the grommet 32. The base portion 71 has an arcuate opening 72 and a rectangular opening 73 formed continuously with each other. The arcuate opening 72 is disposed at a position corresponding to the round hole 55 in the grommet 32. The rectangular opening 73 is disposed at a position corresponding to the flat portion 64 of the grommet 32. The mounting tab 74 that rises vertically from the base portion 71 is disposed at an end portion of the rectangular opening 73.

The mounting tab 74 includes a mounting end 77 disposed at a proximal portion thereof. The mounting end 77 bends into an L-shape and extends on the back side of the base portion 71, specifically, toward a diametric outside of the mounting seat 54 of the grommet 32. The mounting end 77 is fixed in position by being welded to the back side of the base portion 71. The mounting tab 74 is inserted into the positioning hole 58 in the grommet 32 with the base portion 71 of the retainer 33 in abutment with the mounting seat 54 of the grommet 32. The mounting tab 74 has a leading end exposed from a side of the wall portion 57 of the inserting portion 56 of the grommet 32.

A distal end of the mounting tab 74 has a threaded hole 75 processed by burring formed at a portion exposed from the positioning hole 58. Accordingly, the positioning hole 58 is a space with a protruded cross section for accommodating a cross section of the mounting tab 74 and a cross section of the threaded hole 75 processed by burring. The retainer 33 and the direction indicator main unit 31 are fastened together via the grommet 32 by threading the shouldered bolt 34 inserted through the insertion hole 49 in the direction indicator main unit 31 into the threaded hole 75 to thereby tighten the mounting tab 74 to the direction indicator main unit 31.

The retainer 33 has a semi-cylindrical guide 76 extending toward an extended side of the mounting tab 74. The guide 76 is disposed around the arcuate opening 72 in the base portion 71 of the retainer 33. The guide 76 is inserted into the round hole 55 formed in the mounting seat 54 of the grommet 32 to thereby extend at a position inside the fitting portion 52 of the grommet 32.

Figure 11:
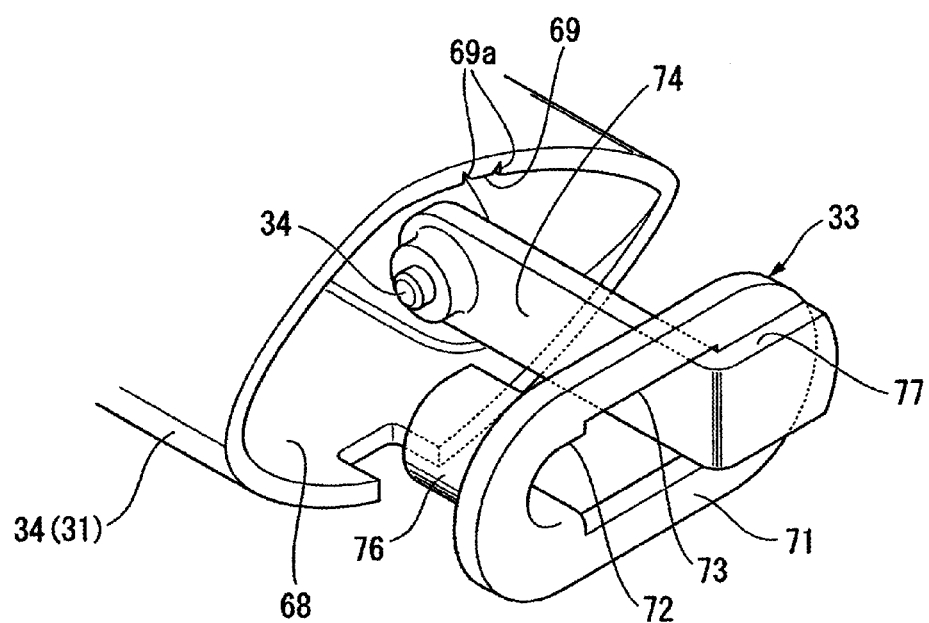
FIG. 11 is a perspective view showing a condition in which the retainer is attached.
Figure 12:
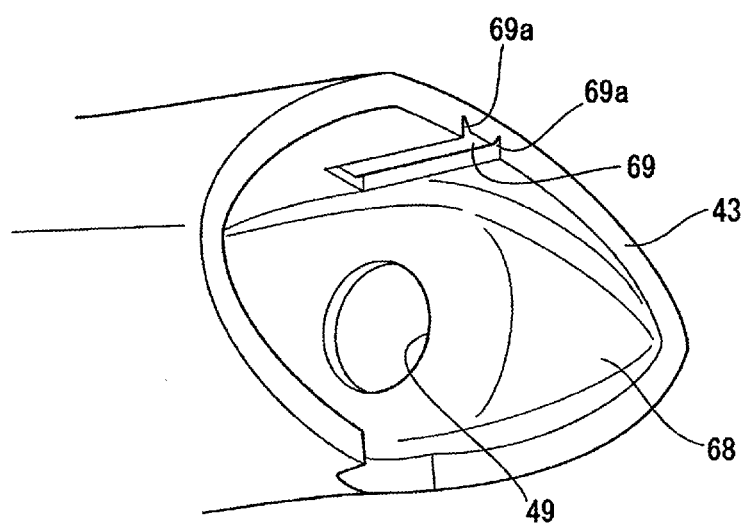
FIG. 12 is a partial enlarged view showing an area near a groove in the direction indicator main unit.

Referring to FIGS. 11 and 12, the inner wall 68 of the proximal portion 43 of the direction indicator main unit 31 has a groove 69 formed therein. The groove 69 makes fragile a portion of the inner wall 68 of the proximal portion 43. The groove 69 is disposed near a fastening portion in the inner wall 68 of the proximal portion 43 of the direction indicator main unit 31, at a position at which a side edge of the mounting tab 74 of the retainer 33 fastened to the direction indicator main unit 31 is located when the direction indicator main unit 31 is installed. The groove 69 is disposed at a portion toward the head portion 41 from an open edge of the proximal portion 43, a position upward in a vehicle body vertical direction; specifically, a position at which the mounting tab 74 of the retainer 33 interferes with the direction indicator main unit 31, the position being in a direction in which, when the motorcycle 1 tips over, the direction indicator main unit 31 abuts on the road surface to thereby be bent by the grommet 32. Deep slits 69a, which that serve as starting points of deformation or damage when an external force acts, are formed on either side of the groove 69. Specifically, when the groove 69 is pressed by the mounting tab 74 of the retainer 33, the direction indicator main unit 31 is deformed or damaged with the slits 69a as the starting points.

In the above-described embodiment of the present invention, the front direction indicator 29 is mounted on the front cowl 24 as follows. Specifically, the side of the mounting seat 54 of the grommet 32 is pushed into the opening 51 in the front cowl 24 to thereby fit the fitting portion 52 of the grommet 32 into the opening 51. The grommet 32 is thereby fitted to the front cowl 24.

Next, the inner wall 68 of the proximal portion 43 of the direction indicator main unit 31 is inserted from the outside over the inserting portion 56 disposed on the support portion 53 of the grommet 32 to thereby attach the direction indicator main unit 31 to the support portion 53 of the grommet 32. Since the inserting portion 56 of the grommet 32 is slightly larger in dimension than the inner wall 68 of the proximal portion 43 of the direction indicator main unit 31, the inserting portion 56 of the grommet 32 is compressed at this time, so that the direction indicator main unit 31 is temporarily fixed in place by the grommet 32 that tends to restore to its original position.

Then, the mounting tab 74 of the retainer 33 is inserted into the positioning hole 58 in the mounting seat 54 of the grommet 32 from the inside of the front cowl 24 to thereby position the retainer 33 relative to the grommet 32. The guide 76 of the retainer 33 is inserted into the round hole 55 in the mounting seat 54 of the grommet 32 and pushed until the base portion 71 of the retainer 33 abuts against the mounting seat 54 of the grommet 32.

Next, the shouldered bolt 34 is inserted into the insertion hole 49 formed in the escape recess 48 in the rear surface of the constricted portion 42 of the direction indicator main unit 31. The shouldered bolt 34 is then tightened to the threaded hole 75 in the mounting tab 74 of the retainer 33.

When tightening of the retainer 33 is completed, the wiring harness 67 that has previously been extended into the inside of the front cowl 24 through the rectangular opening 73 in the retainer 33 via the insertion portion 40 and the penetration portion 63 of the grommet 32 is wired to thereby complete the assembly of the front direction indicator 29.

The direction indicator main unit 31 is therefore elastically supported relative to the front cowl 24 via the grommet 32, so that vibration or impact acting on the direction indicator main unit 31 can be reduced and the bulb 44 and associated parts can be protected from vibration.

In addition, simple replacement of the grommet 32 permits application of the same direction indicator main unit 31 to various vehicle models, achieving good versatility.

While the direction indicator main unit 31 is supported elastically by the grommet 32, the base portion 71 of the retainer 33 has an outline larger than the opening 51 in the front cowl 24. Further, the fitting portion 52 of the grommet 32 can prevent a diameter of the fitting portion 52 from being decreased by the guide 76 of the retainer 33 when the guide 76 is inserted in the round hole 55 in the grommet 32. The grommet 32 can therefore never come off from the front cowl 24.

Figure 13:
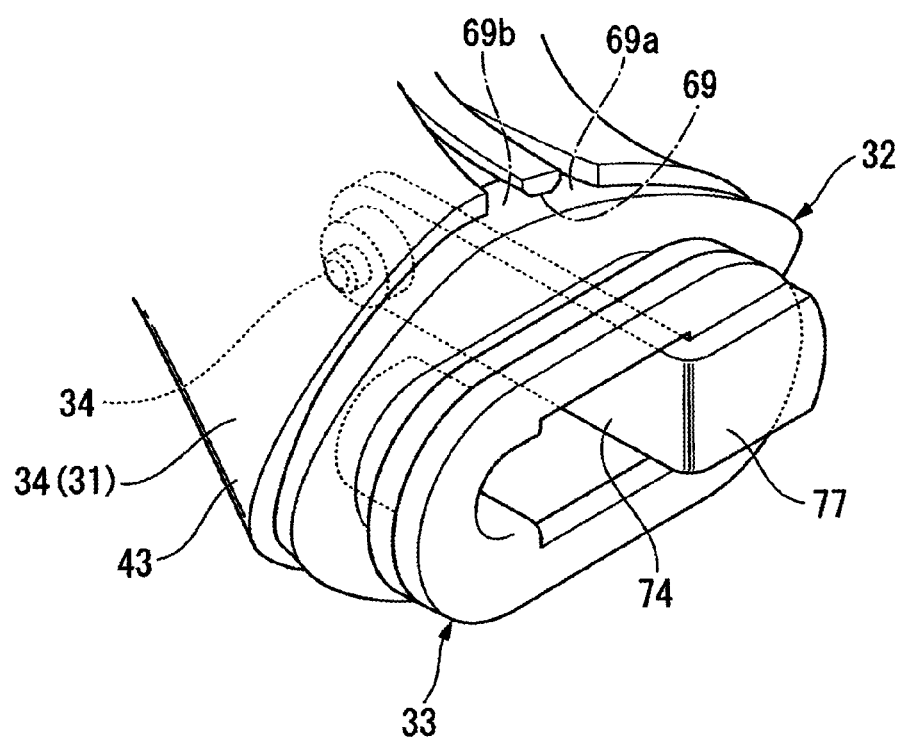
FIG. 13 is a perspective view showing a condition in which the direction indicator main unit is damaged.

When the motorcycle 1 tips over to the right and the direction indicator main unit 31 abuts on the road surface, so that an upward stress acts from the road surface to thereby rotate the direction indicator main unit 31 obliquely upwardly relative to the front cowl 24 about the proximal portion 43, the mounting tab 74 of the retainer 33, having a greater stiffness than the direction indicator main unit 31, is raised relatively upwardly to thereby apply an upward stress directly to the groove 69. The stress then causes the direction indicator main unit 31 to be deformed or damaged with the groove 69 (the slits 69a in particular) on the side of the open edge of the proximal portion 43 as the starting point. For example, referring to FIG. 13, the proximal portion 43 of the direction indicator main unit 31 is pressed by the mounting tab 74 of the retainer 33, damaged starting with the open edge with the slits 69a in the groove 69 as the starting point, and deformed so as to ride over part of the grommet 32.

Accordingly, even if the motorcycle 1 tips over with a resultant impact force acting on the front direction indicator 29, only the direction indicator main unit 31 is deformed or damaged, so that stress concentration on the front cowl 24 can be avoided and deformation or damage of the front cowl 24 can be minimized. Subsequent repair work may then require that only the deformed or damaged direction indicator main unit 31 be replaced with a new one. If the front cowl 24 or other part on the vehicle body side does not need to be repaired, cost of, for example, repair can be reduced.

The front direction indicator 29 has been heretofore described as an example; however, the present invention can also be applied to the rear direction indicator 30 of the motorcycle 1 as shown in FIG. 1. In this case, the rear cowl 27 on which the rear direction indicator 30 is mounted can be prevented from being deformed or damaged during upset of the motorcycle 1. In addition to the arrangement in which the rear direction indicator 30 is mounted on the rear cowl 27, the present invention may also be applied to an arrangement in which a rear direction indicator 30' is disposed on a side wall of the rear fender 35 (as indicated by a chain line in FIG. 1). The present invention is also applicable to an arrangement in which the front direction indicator 29 is disposed on any vehicle body panel member other than the front cowl 24.

Figure 14:
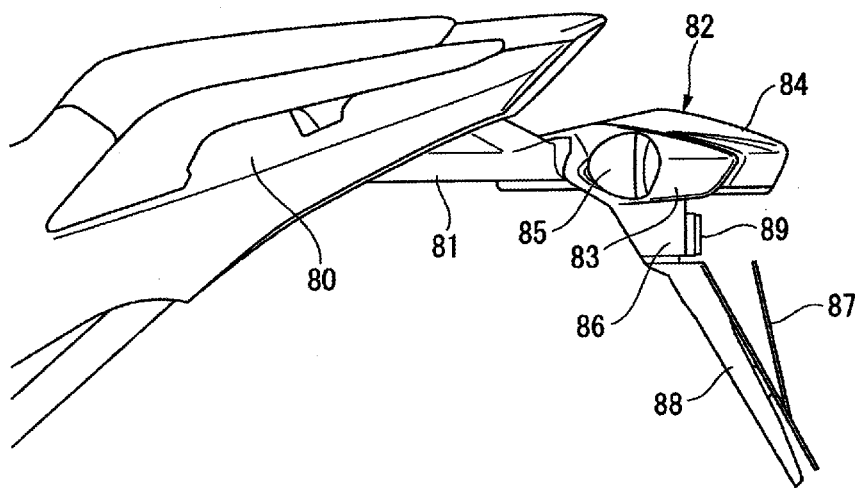
FIG. 14 is a side elevational view showing an area around a rear direction indicator of a motorcycle according to another embodiment of the present invention; and, FIG. 15 is a perspective view showing a rear portion of the rear direction indicator shown in FIG. 14.
Figure 15:
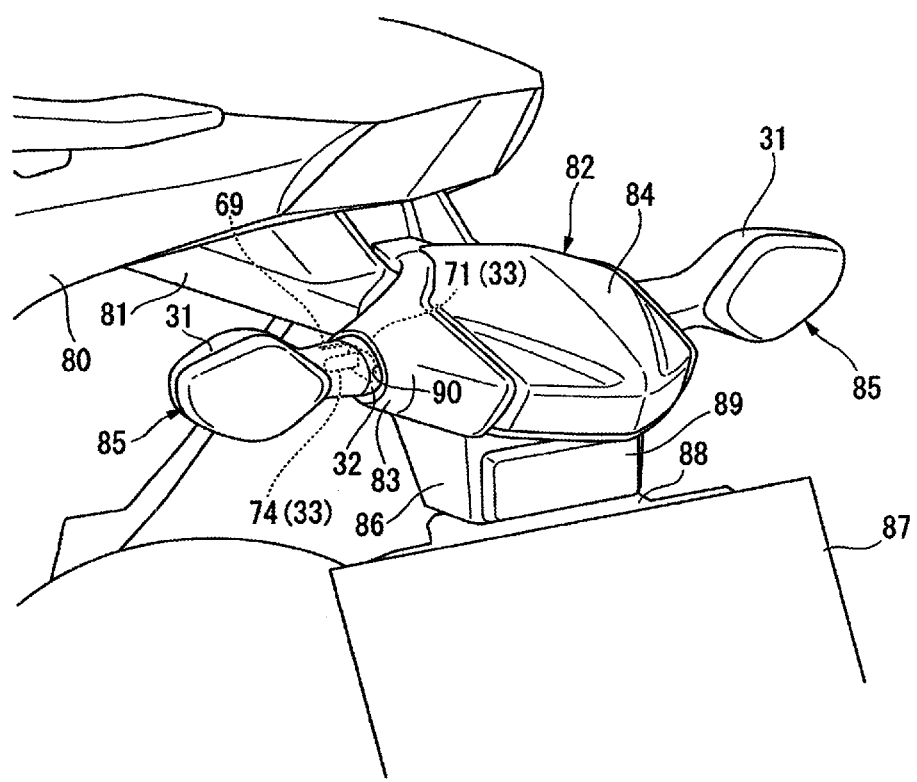

Referring to FIGS. 14 and 15, a second embodiment of the present invention will be described in which the present invention is applied to a rear direction indicator of a motorcycle having a different rear portion structure. In the second embodiment of the present invention, like or corresponding parts are identified by the same reference numerals as those used for the above-described embodiment of the present invention.

A motorcycle according to the second embodiment of the present invention incorporates a rear structure having different arrangements from those of the first embodiment of the present invention. A left-and-right half split type rear cover 81 extending rearwardly is disposed on a rear surface of a rear cowl 80. A taillight unit 82 is disposed at a rear end portion of the rear cover 81.

The taillight unit 82 includes a taillight cover 83 and a taillight 84. Specifically, the taillight cover 83 is split into a left-hand half and a right-hand half disposed on either side. The taillight 84 extends from an upper portion to a rear portion and to a lower portion in the middle in the width direction of the taillight cover 83. A rear direction indicator 85 is disposed on each of left and right outside surfaces of the taillight cover 83. A lower portion of the taillight unit 82 is formed with an under cover 86. A rear fender 88 for supporting a license plate 87 is disposed on a lower portion of the under cover 86 in a position inclined obliquely downwardly toward the rear. A reflector 89 is disposed on a rear surface of the under cover 86.

The rear direction indicator 85 shares the same mounting structure as the front direction indicator 29 of the first embodiment of the present invention. The taillight cover 83 has an opening 90 for mounting the rear direction indicator 85 having the same arrangement as that for the opening 51 for mounting the front direction indicator 29.

A grommet 32 having the same arrangement as that for the front direction indicator 29 is fitted in the opening 90 in the taillight cover 83 and a base portion 71 of a retainer 33 is disposed on an inner wall side of the taillight cover 83. A mounting tab 74 attached to the base portion 71 of the retainer 33 is inserted into the grommet 32 and extended to an outside of the taillight cover 83. The mounting tab 74 is then inserted into a direction indicator main unit 31 of the rear direction indicator 85. The mounting tab 74 is next fastened and fixed to the direction indicator main unit 31 using a shouldered bolt 34 (not shown).

In the rear direction indicator 85, too, a groove 69 is formed at a position at which the retainer 33 interferes with the direction indicator main unit 31, located in a direction in which the direction indicator main unit 31 is bent by the grommet 32 after the direction indicator main unit 31 abuts on the road surface.

In the second embodiment of the present invention, too, therefore, even if the motorcycle 1 tips over with a resultant impact force acting on the rear direction indicator 85, only the direction indicator main unit 31 is deformed or damaged, so that stress concentration on the taillight cover 83 can be avoided and deformation or damage of the taillight cover 83 can be minimized. Subsequent repair work may then require that only the deformed or damaged direction indicator main unit 31 be replaced with a new one. If the taillight cover 83 or other part on the vehicle body side does not need to be repaired, cost of, for example, repair can be reduced.

Preferred embodiments of the present invention have been presented for the purposes of illustration and description. They are not intended to be exhaustive or to limit the invention to the precise forms disclosed. For example, the present invention may be applied to a three-wheeled or four-wheeled buggy as long as the buggy is a saddle riding type vehicle.

DESCRIPTION OF REFERENCE NUMERALS

1: Motorcycle (saddle riding type vehicle)
29: Front direction indicator
30, 30', 85: Rear direction indicator
31: Direction indicator main unit
24: Front cowl (fixing portion)
32: Grommet (elastic member)
33: Retainer (fixing member)
34: Shouldered bolt (fastening member)
69: Groove (fragile portion)
27: Rear cowl (fixing portion)
35: Rear fender (fixing portion)
58: Positioning portion (positioning hole)
82: Taillight unit (fixing portion)
84: Taillight
83: Taillight cover

What is claimed is:

1. A direction indicator comprising:
   a direction indicator main unit;
   an elastic member for elastically supporting the direction indicator main unit to a fixing portion on a vehicle body side;
   a fixing member for removably fixing the fixing portion on the vehicle body side and the direction indicator main unit via the elastic member; and
   a fastening member for fastening the fixing member and the direction indicator main unit, wherein:
   the direction indicator main unit to which the fixing member is fastened with the fastening member has a fragile portion disposed near the fastening portion.

2. The direction indicator according to claim 1, wherein:
   the fixing portion on the vehicle body side includes a front cowl.

3. The direction indicator according to claim 1, wherein:
   the fixing portion on the vehicle body side includes a rear cowl.

4. The direction indicator according to claim 1, wherein:
   the fixing portion on the vehicle body side includes a rear fender.

5. The direction indicator according to claim 1, wherein:
   the fixing member is formed of a metal having stiffness greater than the direction indicator main unit formed of a resin.

6. The direction indicator according to claim 5, wherein:
   the fragile portion of the direction indicator main unit is disposed at a position at which the fixing member and the direction indicator main unit interfere with each other, the position being in a direction in which the direction indicator main unit abuts on a road surface to thereby be bent by the elastic member.

7. The direction indicator according to claim 1, wherein:
   the fixing member includes a mounting tab extending from an inside of the fixing portion on the vehicle body side to the direction indicator main unit on an outside;
   the mounting tab has a mounting end disposed at a proximal portion thereof, the mounting end being bent and extending toward a diametric outside of a mounting seat of the elastic member; and
   the mounting tab has a distal end fastened to the direction indicator main unit with the fastening member.

8. The direction indicator according to claim 1, wherein:
   the fragile portion is disposed on an upper side in a vehicle body vertical direction of the direction indicator main unit.

9. The direction indicator according to claim 1, wherein:
   the elastic member has a positioning portion for positioning the fixing member.

10. The direction indicator according to claim 1, wherein:
    the fixing portion on the vehicle body side includes a taillight unit;
    the taillight unit includes a taillight and a taillight cover; and
    the direction indicator main unit mounted by fitting the elastic member in the taillight cover is fastened with the fastening member to the fixing member inserted into the elastic member from an inside of the taillight cover.

11. A saddle riding type vehicle comprising a direction indicator, said direction indicator comprising:
   a direction indicator main unit;
   an elastic member for elastically supporting the direction indicator main unit to a fixing portion on a vehicle body side;
   a fixing member for removably fixing the fixing portion on the vehicle body side and the direction indicator main unit via the elastic member; and
   a fastening member for fastening the fixing member and the direction indicator main unit, wherein:
   the direction indicator main unit to which the fixing member is fastened with the fastening member has a fragile portion disposed near the fastening portion, said fragile portion being adapted to be deformed prior to the fixing portion on the vehicle body side upon application of an upwardly directed force.

12. The saddle riding type vehicle according to claim 11, wherein:
   the fixing portion on the vehicle body side includes a front cowl.

13. The saddle riding type vehicle according to claim 11, wherein:
   the fixing portion on the vehicle body side includes a rear cowl.

14. The saddle riding type vehicle according to claim 11, wherein:
   the fixing portion on the vehicle body side includes a rear fender.

15. The saddle riding type vehicle according to claim 11, wherein:
   the fixing member is formed of a metal having stiffness greater than the direction indicator main unit formed of a resin.

16. The saddle riding type vehicle according to claim 15, wherein:
   the fragile portion of the direction indicator main unit is disposed at a position at which the fixing member and the direction indicator main unit interfere with each other, the position being in a direction in which the direction indicator main unit abuts on a road surface to thereby be bent by the elastic member.

17. The saddle riding type vehicle according to claim 11, wherein:
   the fixing member includes a mounting tab extending from an inside of the fixing portion on the vehicle body side to the direction indicator main unit on an outside;
   the mounting tab has a mounting end disposed at a proximal portion thereof, the mounting end being bent and extending toward a diametric outside of a mounting seat of the elastic member; and
   the mounting tab has a distal end fastened to the direction indicator main unit with the fastening member.

18. The saddle riding type vehicle according to claim 11, wherein:
   the fragile portion is disposed on an upper side in a vehicle body vertical direction of the direction indicator main unit.

19. The saddle riding type vehicle according to claim 11, wherein:
   the elastic member has a positioning portion for positioning the fixing member.

20. The saddle riding type vehicle according to claim 11, wherein:
   the fixing portion on the vehicle body side includes a taillight unit;
   the taillight unit includes a taillight and a taillight cover; and
   the direction indicator main unit mounted by fitting the elastic member in the taillight cover is fastened with the fastening member to the fixing member inserted into the elastic member from an inside of the taillight cover.

* * * * *